(12) United States Patent
Valliere

(10) Patent No.: US 9,067,568 B2
(45) Date of Patent: Jun. 30, 2015

(54) WINDSHIELD WIPER DEVICE FOR MOTOR VEHICLE

(75) Inventor: Jérôme Valliere, Les Ormes (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 13/979,587

(22) PCT Filed: Jan. 16, 2012

(86) PCT No.: PCT/EP2012/050553
§ 371 (c)(1),
(2), (4) Date: Sep. 13, 2013

(87) PCT Pub. No.: WO2012/098072
PCT Pub. Date: Jul. 26, 2012

(65) Prior Publication Data
US 2013/0340196 A1    Dec. 26, 2013

(30) Foreign Application Priority Data

Jan. 17, 2011   (FR) .................................... 11 50358

(51) Int. Cl.
*B60S 1/34*    (2006.01)
*B60S 1/04*    (2006.01)

(52) U.S. Cl.
CPC .............. *B60S 1/3488* (2013.01); *B60S 1/0444* (2013.01); *B60S 1/0447* (2013.01)

(58) Field of Classification Search
CPC ........ B60S 1/3493; B60S 1/583; B60S 1/349; B60S 1/0438
USPC ............... 296/96.15, 96.17; 15/250.3, 250.34
See application file for complete search history.

(56) References Cited

U.S. PATENT DOCUMENTS

| | | | |
|---|---|---|---|
| 6,343,403 B1 * | 2/2002 | Kanazawa | .................... 15/250.3 |
| 2004/0091305 A1 | 5/2004 | Egner-Walter et al. | |

FOREIGN PATENT DOCUMENTS

| | | |
|---|---|---|
| DE | 102006032869 A1 | 1/2008 |
| EP | 1718507 B1 | 1/2008 |
| WO | 2005/080156 A1 | 9/2005 |

OTHER PUBLICATIONS

International Search Report issued in PCT/EP2012/050553 mailed on Apr. 2, 2012 (4 pages).

* cited by examiner

*Primary Examiner* — Dennis H Pedder
*Assistant Examiner* — Dana Ivey
(74) *Attorney, Agent, or Firm* — Osha Liang LLP

(57) ABSTRACT

The invention relates to a windshield wiper device (1) having at least one connection for mounting on the body of a motor vehicle, this connection consisting of a fastening element that can be pushed into a receiving opening in the body and comprises a sleeve (4A, 4B) made of a deformable material of the rubber type, which can be introduced into this opening and has a bore (6) that receives the free end of a fastening finger (5) carried by the windshield wiper device. According to the invention, the external cross section of said fastening finger (5) is in the form of a cross and the shape of said bore (6) has a complementary shape, the length of the perpendicular branches (5A to 5D) of said cross being at least partially different, such as to ensure polarization and mounting of the sleeve on the fastening finger in a precise position in which rotation is prevented.

7 Claims, 3 Drawing Sheets

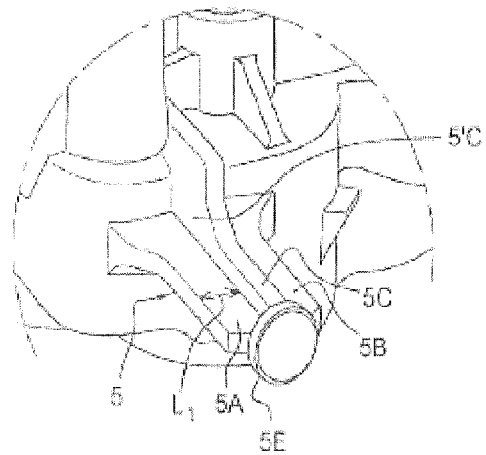
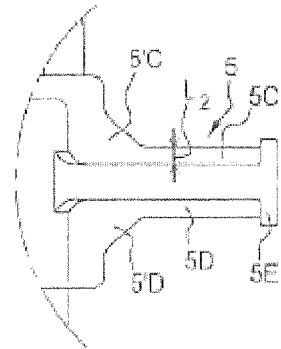
Fig. 5          Fig. 6
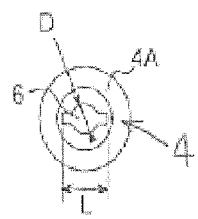 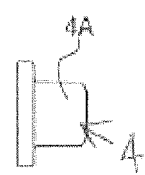 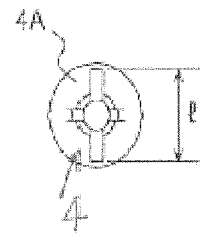
Fig. 7A          Fig. 7B          Fig. 7C
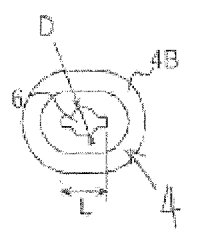 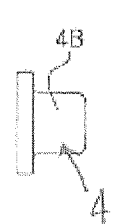 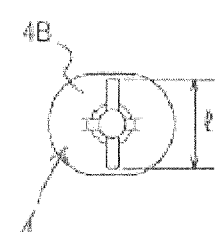
Fig. 8A          Fig. 8B          Fig. 8C

WINDSHIELD WIPER DEVICE FOR MOTOR VEHICLE

The invention relates to a windshield wiper device for a motor vehicle.

Such a windshield wiper device is described in Patent EP 1 718 507. This windshield wiper device comprises at least three connections at a distance from one another in order to carry out mounting without screwing the windshield wiper system or a support of this device onto the body of the motor vehicle. These connections consist respectively of a fastening element that can be pushed into a receiving opening of the body and comprise a socket made of deformable material of the rubber type that can be inserted into this opening. This socket, which forms a damper, is threaded onto a fastening finger obtained by molding on the windshield wiper device and is prevented thereon from being translated by an annular rib supported by the fastening finger.

According to this document, the socket has a circular external cross section and comprises an internal bore with a section that is also circular receiving the fastening finger which has a cross section that is also circular.

On certain vehicles, provision is made to install such a socket but of oblong external cross section, the corresponding opening in the body having this shape.

In this case, it is necessary to ensure mounting and retention of the socket on the fastening finger in a precise position in which rotation is prevented because of the shape and the position of the opening of the body. A specific cross section of the internal bore of the socket and hence of the fastening finger is therefore produced. One known shape of this section is an H shape.

Currently, this difference of shape of the opening in the body therefore requires the fastening finger to be made differently and hence a different windshield wiper device, the fastening finger being obtained by molding with this device supporting a motor and designed to receive the windshield wiper blade.

The object of the invention is to standardize such a windshield wiper device so that its fastening finger can receive equally a socket with a circular external cross section and a socket with an oblong external cross section.

In order to do this, the invention proposes a windshield wiper device comprising at least one connection for mounting on the body of a motor vehicle, this connection consisting of a fastening element that can be pushed into a receiving opening of the body and comprising a socket made of deformable material of rubber type that can be inserted into this opening and comprising a bore receiving the free end of a fastening finger supported by the windshield wiper device, characterized in that the external cross section of said fastening finger is in the shape of a cross and the shape of said bore is of complementary shape, the length of the perpendicular branches of said cross being at least partially different so as to ensure polarization and mounting of the socket on the fastening finger in a precise position in which rotation is prevented.

This cross shape makes it possible to interact with an equally standard bore of the socket, whether the latter has a circular or oblong external cross section. This complementary section has dimensions as a function of the external dimensions of the socket, optimally to ensure sufficient strength of the material around this bore.

Such a shape of the fastening finger makes it possible to install a socket of oblong or circular section but also makes it possible to obtain good fastening rigidity in the overall system when the section of the socket is oblong.

By means of the different lengths of the branches of the cross-shaped section of the fastening finger, the socket is prevented from rotating which is essential when the latter has an oblong external cross section.

According to a preferred embodiment, the length of two aligned branches of said cross increases at the end opposite to said free end so as to form polarizing portions.

These two portions perform an effective polarizing function that is indispensible when the socket has an oblong external cross section and must therefore be prevented from rotating in a precise position, in order to correspond with the oblong shape of the opening of the body.

Preferably, the length of the perpendicular branches of said cross is different over the whole length of said fastening finger.

Advantageously, the length ratio of the perpendicular branches of said cross is equal to approximately ½.

Preferably, said bore of said socket has a cylindrical cross section with a diameter substantially equal to the distance between the ends of the two branches of shorter length, associated with a first slot with a length substantially equal to the distance between the ends of the two branches of greater length.

This specific section of the bore of the socket allows the latter to be mounted on the fastening finger more easily than if it also had a section in the shape of a cross.

Said bore preferably comprises a second slot perpendicular to the first slot and having a length substantially equal to the distance between the ends of the two polarizing portions of the branches of greater length.

The fitting of this second slot with the polarizing portions of the fastening finger ensures a correct relative positioning of the socket and of the fastening finger in order to correspond with the oblong shape of the opening of the body.

Said free end of the fastening finger advantageously comprises an annular rib to prevent said socket from moving in translation.

The invention is described below in greater detail with the aid of figures representing only one preferred embodiment of the invention.

FIGS. 5 and 6 are detail views, in perspective and in section, of a windshield wiper device before mounting of a socket.

FIG. 7 are front, side and cross-sectional views of a socket having a circular external cross section.

FIG. 8 are front, side and cross-sectional views of a socket having an oblong external cross section.

Figure 1:
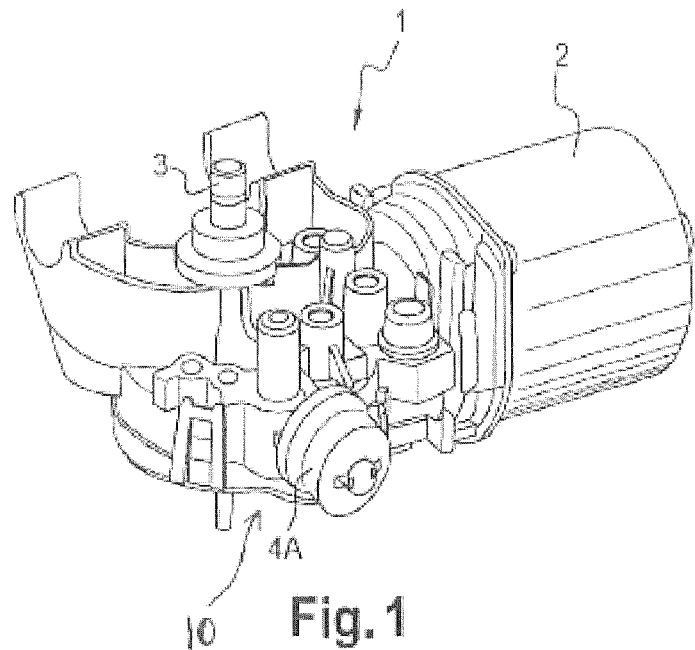
FIGS. 1 and 2 are views in perspective of a windshield wiper device fitted, for FIG. 1, with a socket having a circular external cross section and, for FIG. 2, with a socket having an oblong external cross section.
Figure 2:
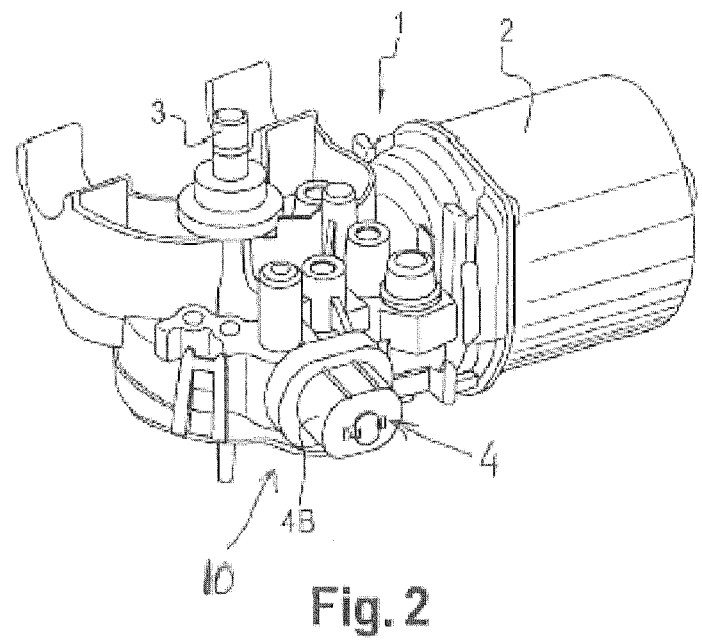

FIGS. 1 and 2 represent a windshield wiper device 1 supporting a motor 2 and designed to receive the windshield wiper blade by means of a pivot 3. This device 1 is fitted, for FIG. 1, with a socket having a circular external cross section 4A and, for FIG. 2, with a socket having an oblong external cross section 4B. This socket 4A, 4B made of deformable material of rubber type constitutes a fastening element 4, designed to be pushed into a corresponding receiving opening of the body.

Figure 3:
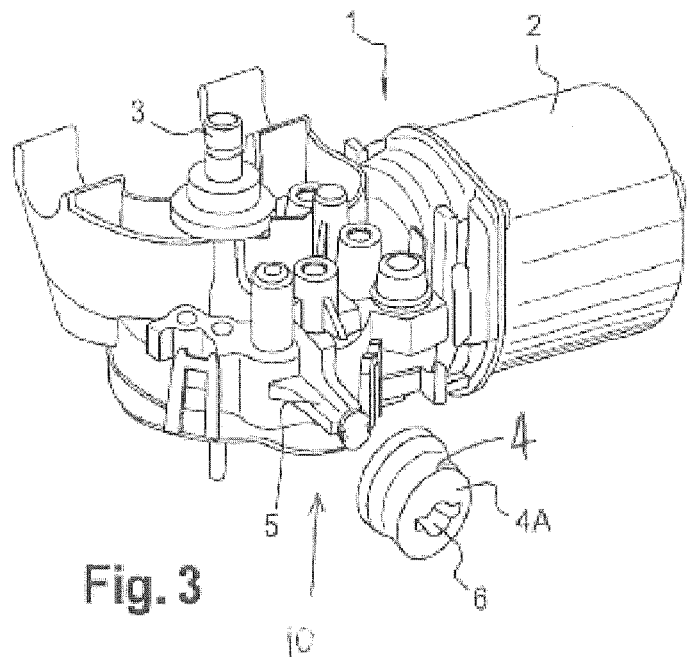
FIGS. 3 and 4 are views in perspective of a windshield wiper device before mounting for FIG. 3 of a socket having a circular external cross section and for FIG. 4 of a socket having an oblong external cross section.
Figure 4:
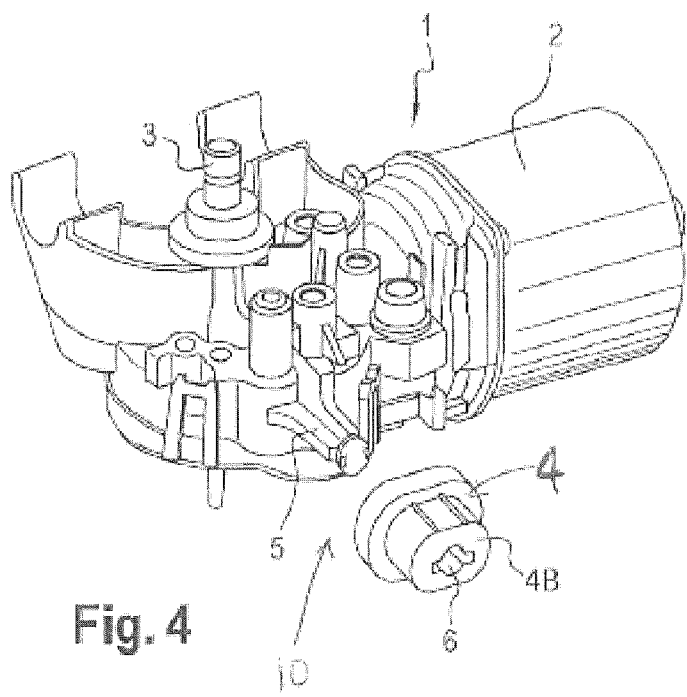

As can be seen in FIGS. 3 and 4, this socket 4A, 4B comprises a bore 6 receiving the free end of a fastening finger 5 obtained from molding on the windshield wiper device 1.

Fastening finger 5 and socket 4A, 4B therefore form a connection 10 for mounting wiper device 1 on the body of a motor vehicle.

As is more clearly visible in FIGS. 5 and 6, the external cross section of the fastening finger 5 is in the shape of a cross, the shape of the bore of the socket being of complementary shape, the length of the perpendicular branches of this cross being at least partially different, so as to ensure polarization and mounting of the socket on the fastening finger in a precise keyed position in which rotation is prevented.

In other words, seen in cross section, the aligned branches 5A, 5B have a length $L_1$ that differs from that $L_2$ of the perpendicular branches 5C, 5D of the latter.

Preferably, the length ratio $L_2/L_1$ of the perpendicular branches of said cross is equal to approximately ½.

In order to further prevent this rotation and above all this polarization, taking account of the deformable character of the socket designed to be mounted on the fastening finger 5, the length of the branches 5C, 5D of shorter length increases at the end opposite to the free end of the fastening finger 5 in order to form polarizing portions 5'C, 5'D, the length of the branches 5A, 5B of greater length remaining constant.

According to this preferred embodiment, the length of the perpendicular branches of the cross-shaped section is different over the whole length of the fastening finger 5.

The free end of the fastening finger 5 also comprises an annular rib 5E to prevent translational movement of the socket.

FIGS. 7 and 8 are front, side and cross-sectional views of a socket having a circular external cross section 4A or oblong cross section 4B, which may both be mounted on the windshield wiper device 1, by virtue of the arrangement of the fastening finger 5 described above.

These sockets comprise a bore for receiving the fastening finger 5 which has a cylindrical cross section with a diameter D that is substantially equal to the distance between the ends of the two branches 5C, 5D of shorter length $L_2$, associated with a first slot having a length L substantially equal to the distance between the ends of the two branches 5A, 5B of greater length $L_1$.

At their end turned toward the device 1, as can be seen in the sectional view of FIGS. 7C and 8C, this bore comprises a second slot perpendicular to the first slot and having a length 1 substantially equal to the distance between the ends of the two polarizing portions 5'C, 5'D of the branches of greater length $L_1$.

The invention claimed is:

1. A windshield wiper device comprising:
   at least one connection for mounting on a body of a motor vehicle, the at least one connection comprising:
   a fastening element configured to be pushed into a receiving opening of the body,
   a socket made of deformable material of rubber type configured to be inserted into the receiving opening, and
   a bore of the socket receiving a free end of a fastening finger supported by the windshield wiper device,
   wherein an external cross section of said fastening finger comprises a shape of a cross and said bore presents a shape that is complementary to said cross shape,
   a length of two aligned branches of said cross being at least partially different from a length of perpendicular branches of said cross.

2. The device as claimed in claim 1, wherein the fastening finger further comprises keyed portions, wherein the keyed portions prevent rotation of the socket and are comprised of a length of two aligned branches of said cross increases at the end opposite to said free end.

3. The device as claimed in claim 1, wherein the length of the perpendicular branches of said cross is different over a whole length of said fastening finger.

4. The device as claimed in claim 3, wherein the length ratio of the perpendicular branches of said cross is equal to approximately ½.

5. The device as claimed in claim 3, wherein said bore of said socket has a cylindrical cross section with a diameter substantially equal to a distance between the ends of the two branches of shorter length, associated with a first slot with a length substantially equal to the distance between the ends of the two branches of greater length.

6. The device as claimed in claim 5, wherein said bore comprises a second slot perpendicular to the first slot and having a length substantially equal to a distance between ends of two keyed portions of the branches of greater length.

7. The device as claimed in claim 1, wherein the free end of the fastening finger comprises an annular rib.

\* \* \* \* \*